Patented July 24, 1951

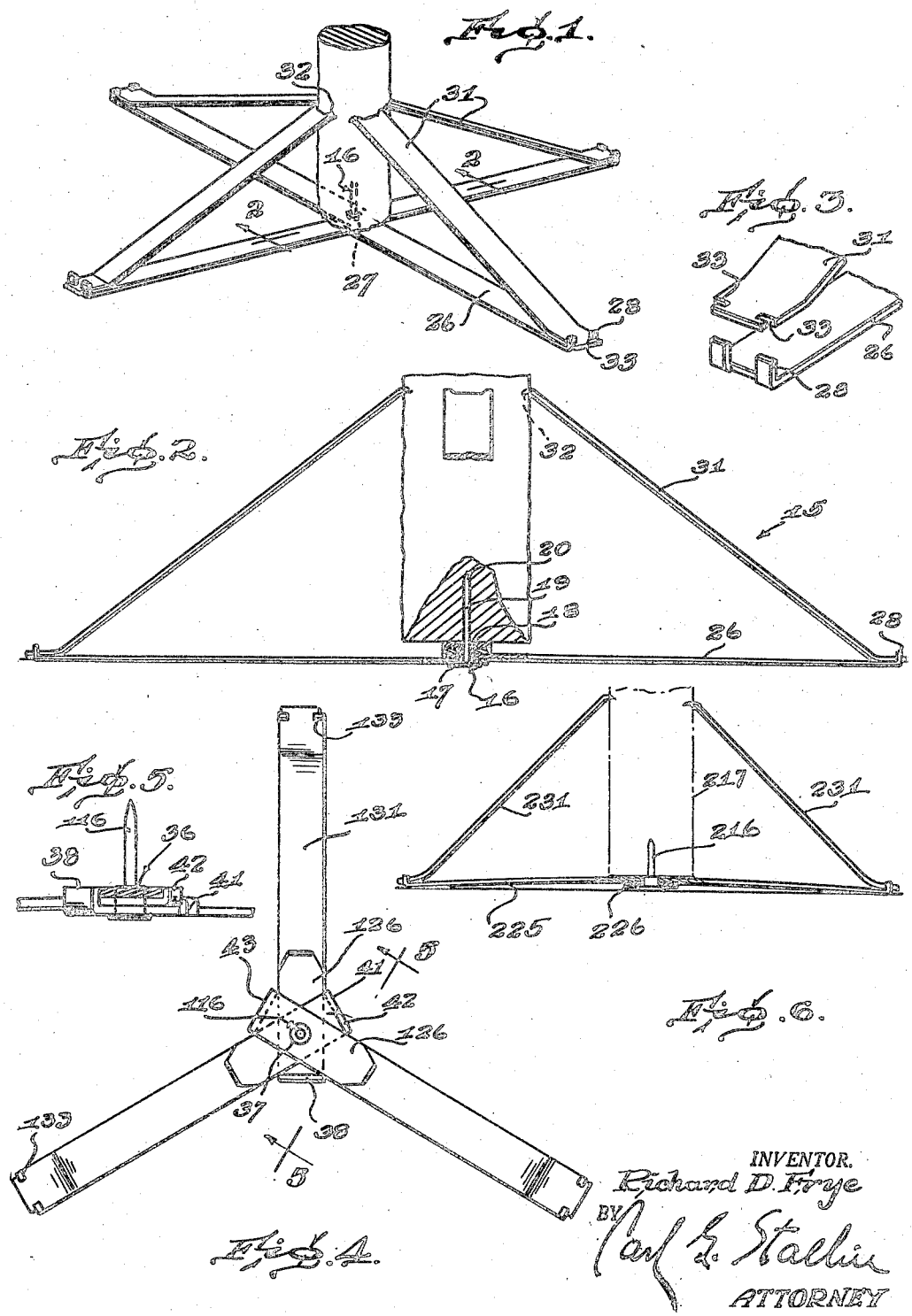

2,561,693

UNITED STATES PATENT OFFICE 2,561,693

STAND FOR CHRISTMAS TREES OR THE LIKE

Richard D. Frye, Adrian, Mich.

Application January 19, 1946, Serial No. 642,325

3 Claims. (Cl. 248—44)

This invention relates to holders or stands, and more particularly to base stands for holding in upright position cut trees, such as Christmas trees, stools, posts, signs, poles, pedestals or the like.

It is an object of the invention to provide a stand for securely supporting a tree trunk or the like that can be assembled readily from a few simple parts that can be stored or shipped in nested relation in a very small container.

It is a further object of the invention to provide a knock-down stand of this type employing a minimum number of kinds of parts so that manufacture of the stand requires the production of only a minimum of different pieces.

Other objects of the invention are the provision of a stand so constructed that the weight of the tree supported by the stand acts to tighten the grip of the tree-engaging elements of the stand; a stand that permits ready adjustment of the trunk to its desired vertical (or off-vertical) position; and a stand that can be quickly applied to the base of the tree without cutting, tapering, or other shaping of the base of the tree trunk.

Referring to the drawings:

Figure 1 is a perspective view of the stand of the present invention assembled and in position to support a cut tree;

Figure 2 is a side elevational view of the stand partly broken away and partly in section on the line 2—2 of Figure 1;

Figure 3 is a detail perspective view of a portion of the stand, showing the parts in position for assembly;

Figure 4 is a plan view of an assembled stand embodying a modification of the invention;

Figure 5 is an edge elevational view of the stand of Figure 4 partly broken away and partly in section on the line 5—5 of Figure 4; and Figure 6 is a cross-sectional elevation view of a modified embodiment of the present invention.

The stand represented in Figures 1, 2 and 3 comprises a coupling or center pin 16 formed with a flat head 17, a polygonal shank portion 18, preferably immediately adjacent the head, and a reduced shank portion 19 extending from the shank portion 18 and ending at a sharpened point 20. The pin 16 may be an ordinary nail with a polygonal shank portion 18 fitted over it with a friction grip.

The pin 16 is employed to couple together at one of their ends, several base members 26, preferably four in number, in equally spaced angular relation. The members 26 are each formed with a polygonal opening 27 in one end and with a pair of spaced apart lugs 28 at the opposite end, the lugs being right-angularly related to the member 26.

The stand comprises also a plurality of struts 31 corresponding in number to the members 26. Each of the struts 31 is provided at one end with pointed projections or teeth 32 preferably curved slightly relative to the struts 31 and at its other end with notches 33 in opposite side edges of the strut 31, the notches being in alignment with each other and proportioned to receive the lugs 28 on the members 26.

The stand is assembled by inserting the center pin 16 through the polygonal opening 27 in one of the members 26 and then passing it through a second of the members 26 with the second member angularly related to the first member. The pin is then passed through the openings in the nest of the members 26 with each member angularly placed relative to the last assembled member. Where four members 26 are provided, there are preferably square openings 27 in the ends of the members so that the members in assembly are each spaced 90° from the adjacent members. Where three or five or more members 26 would be provided, then the openings 27 and the portion 18 of the coupling pin would be of triangular shape, pentagonal shape, or other shape corresponding to the numbers of the members 26. After the members 26 have been assembled to the pin 16, the reduced shank 19 of the pin is driven into the bottom of the trunk of the tree to be supported to secure the assembly to the tree. The shoulder formed by the polygonal portion of the shank 18 of the pin preferably abuts or pierces the surface of the bottom of the tree trunk so that the members 26 are prevented from slipping off the polygonal portion of the shank of the pin.

The tree may then be set in upright position and the struts 31 put in place by placing the notched end of each member over the outer ends of the members 26 with the lugs 28 on the members 26 received in the notches 33 in the struts 31. The teeth 32 at the other ends of the struts 31 are then forced into the trunk of the tree to hold the tree upright. The vertical position of the tree may be adjusted simply by withdrawing the teeth from the trunk at one or more sides of the tree and tilting the tree in the direction desired and then replacing the teeth.

In setting up the tree, the preferable procedure is to arrange the struts 31 so that the teeth at the ends thereof merely touch the tree trunk. The tree may then be adjusted to its desired vertical position and by pressing down on the tree cause the teeth to become embedded in the trunk of the tree. The necessary downward movement of the tree is permitted by having the polygonal portion 18 of the center pin 16 slightly greater in length than the combined thicknesses of the members 26, so that the bottom of the tree trunk can be forced downwardly over the upper end of the polygonal portion a slight distance before it is arrested by the ends of the members 26. Also, this downward movement may be provided for by driving the center pin into the bottom of the trunk of the tree a distance a little short of the shoulder formed by the polygonal portion.

It will be seen that the present invention is formed from only three extremely simple parts, the first being the center pin, the other two being the base member 26, and the other the strut 31. Each member is substantially straight and they all can be stacked together into a single package approximately 1" to 1½" in cross section and 6" to 10" long (or longer if desired). Such package is so small that it can be stored, shipped and displayed with a minimum of room and can be carried off by the purchaser in a pocket or handbag, and when not in use can be laid aside in a drawer or on a shelf with a minimum of space requirements. The invention is so simple that the principal members 26 and 31 can be produced very inexpensively from sheet metal stampings of a single weight stock.

Various modifications and variations may be resorted to without departing from the spirit and scope of this invention. For example, the modification shown in Figures 4 and 5 differs from the preferred form of the invention in having three pairs of members radiating from the center pin. These members and the center pin are generally similar to those of the preferred form of the invention and like parts, therefore, are designated by similar reference numerals raised to the series 100.

In this form of the invention, the center pin 116 has a shank portion 36 that is circular in cross section instead of polygonal as in the preferred form, and the ends of the members 126 are provided with mating round holes 37.

To position the pairs of members 126, 131 in the desired equally spaced relation, one of the members 126 is provided with a lug 38 at its inner end. The lug 38 is of a length that will engage the other two members 126 to prevent angular movement toward each other from their positions where they are about 120° apart. The member 126 next above the one carrying the lug 38 is provided with two end lugs 41 and 42. These lugs extend at right angles from the member 126 and respectively in opposite directions. The lug 41 engages the bottom member 126 and the lug 42 engages the top member 126 to prevent angular movement of these two members toward each other.

The top member 126 is provided with a lug 43 at its end that is similar to the lug 38 except that it extends in the opposite direction relative to the member 126. This lug 43 is received between the bottom member 126 and the intermediate member 126 and acts to hold these two members in angularly spaced relation. The relation of the lugs 38, 41, 42 and 43 is thus arranged to hold the members 126 angularly spaced about 120° from each other.

In Figure 6 another embodiment of the invention is shown. In this modification, there are two identical base members 225 and 226, respectively, each with a round or polygonal hole in the center through which a mating center pin 216 projects to pierce and hold the post or tree 217. The free ends of the base members are similar to the ends of the base members 26 of Figures 1 to 3 and coact with struts or supports 231 which are similar in design to the struts 31. In setting up this form of stand, the uppermost base member 225 can easily be slightly bent downwardly so that the extremities lie in the same plane as the other base member 226 and thus form a flat sturdy supporting structure. While the resulting package of the entire unit in disassembled form would be somewhat longer than the package of the form shown in Figures 1 to 3, the other benefits of simplicity, strength and ease of erection would be retained.

Other modifications may be made within the spirit of the invention and the scope of the claims.

I claim:

1. A holder for a Christmas tree or the like which comprises a center pin formed of a nail and a polygonal shank fitted over the nail adjacent its head, the point of the nail adapted to pierce the bottom of a cut tree, four flat base members, each having a polygonal hole at one end conforming to the contours of said shank adapted to receive snugly said polygonal shank when said ends are stacked on top of one another and prevent relative rotational movement in the plane of said base members, each base member extending radially with one in each quadrant, lugs at the free ends of said base members extending vertically upwardly, and four struts having recesses at one end adapted to receive and hold said lugs and having teeth at the other end adapted to grip the tree trunk at a position above the bottom thereof and hold the same in position.

2. A stand as set forth in claim 1, in which each of said struts are identical in size and configuration, and each of said base members are identical to one another.

3. A stand as set forth in claim 1, in which the said struts and the said base members are substantially the same width and formed of metal stampings of substantially similar weight of stock, and said struts, base members and center pin are capable of being packaged in parallel relation in a small container.

RICHARD D. FRYE.

REFERENCES CITED

The following references are of record in the file of this patent:

UNITED STATES PATENTS

| Number | Name | Date |
|---|---|---|
| 1,240,319 | Cronick | Sept. 18, 1917 |
| 1,319,481 | Mahon | Oct. 21, 1919 |
| 1,546,314 | Prince | July 14, 1925 |

FOREIGN PATENTS

| Number | Country | Date |
|---|---|---|
| 161,070 | Germany | June 5, 1905 |
| 527,258 | Germany | Mar. 22, 1930 |